(12) United States Patent  (10) Patent No.: US 6,514,135 B1
Kelly  (45) Date of Patent: Feb. 4, 2003

(54) SLOPED PROFILE HINGELESS VENTILATOR

(75) Inventor: Timothy A. Kelly, Salem, VA (US)

(73) Assignee: Salem Vent International, Inc., Salem, VA (US)

( * ) Notice: Subject to any disclaimer, the term of this patent is extended or adjusted under 35 U.S.C. 154(b) by 0 days.

(21) Appl. No.: 09/970,507

(22) Filed: Oct. 3, 2001

(51) Int. Cl.7 .................................................. B60H 1/00
(52) U.S. Cl. ....................................... 454/136; 454/129
(58) Field of Search ................................ 454/129, 134, 454/136, 138, 145, 149, 333

(56) References Cited

U.S. PATENT DOCUMENTS

| 2,182,716 A | * | 12/1939 | Brent .......................... 454/136 |
| 3,046,865 A | | 7/1962 | Kelly |
| 3,102,464 A | | 9/1963 | Kelly et al. |
| 3,358,576 A | | 12/1967 | Kelly et al. |
| 3,375,772 A | | 4/1968 | Kelly et al. |
| 3,587,443 A | * | 6/1971 | Rapport ...................... 160/353 |
| 3,672,291 A | | 6/1972 | Kujawa, Jr. |
| 3,760,707 A | | 9/1973 | Kelly |
| 3,763,760 A | | 10/1973 | Erickson |
| 3,839,950 A | | 10/1974 | Kelly et al. |
| 4,038,911 A | * | 8/1977 | Hart ............................. 454/94 |
| 4,452,129 A | | 6/1984 | Kelley et al. |
| 4,519,645 A | | 5/1985 | Kelly et al. |
| 4,522,115 A | | 6/1985 | Kelly et al. |
| 4,690,040 A | * | 9/1987 | Barnett ....................... 454/136 |
| 5,020,425 A | | 6/1991 | Kelly |
| 5,309,972 A | * | 5/1994 | Thomas ...................... 160/104 |
| 5,342,238 A | * | 8/1994 | Segerpalm et al. ......... 454/136 |
| D390,943 S | | 2/1998 | Kelly |
| D393,707 S | | 4/1998 | Kelly |
| 5,766,068 A | | 6/1998 | Kelly |
| 5,797,791 A | | 8/1998 | Humphrey et al. |
| 6,106,385 A | | 8/2000 | Humphrey et al. |

* cited by examiner

*Primary Examiner*—Derek Boles
(74) *Attorney, Agent, or Firm*—Dority & Manning, P.A.

(57) ABSTRACT

A hingeless ventilator for ventilating an enclosure through a wall thereof, includes a frame, a cover, an actuating member, a handle secured to the actuating member, and a recessed chamber connected to the frame and defining a depth configured to contain the actuating member and the handle. The frame includes a border that defines an opening through the frame and a front and a back. The cover is selectively swingable relative to the frame between a closed position and open positions. The open positions place the cover intermediate the closed position and at least one of the front and back of the border that defines an opening through the frame.

12 Claims, 6 Drawing Sheets

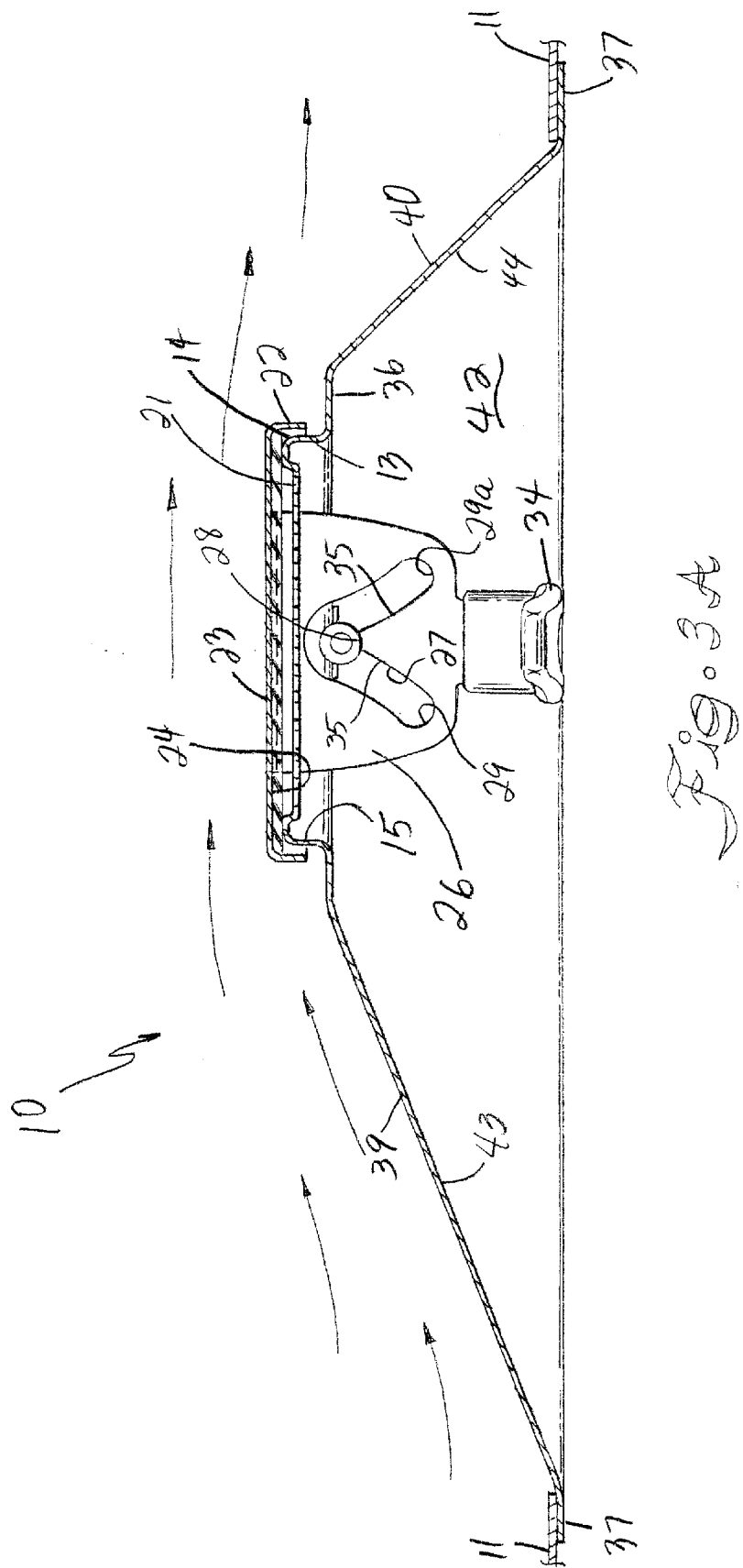

SLOPED PROFILE HINGELESS VENTILATOR

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present Invention pertains to a hingeless ventilator and in particular to such a device that can be used for recreational vehicles, truck cabs, commercial vehicles, horse trailers, van conversions, and marine applications.

Ventilation of a mobile living space such as found in a recreational vehicle is important for occupant comfort as well as good health. Moreover, desirable ventilation may require admitting fresh air into the living space as well as expelling undesirable air out of the living space. While various powered fan devices and hingeless ventilators have been employed for this purpose, many of these intrude into the living space, thus reducing head clearance in the vicinity of such ventilators.

OBJECTS AND SUMMARY OF THE INVENTION

It is a principal object of the present invention to provide an improved hingeless ventilator apparatus that improves the ventilation of mobile living spaces by enhancing air flow that is selectively admitted or expelled, as desired.

It is another principal object of the present invention to provide an improved hingeless ventilator apparatus that includes a recessed chamber with an aerodynamic shape.

It is still another principal object of the present Invention to provide an improved hingeless ventilator apparatus that includes a recessed chamber that permits the clearance necessary for the operating mechanism of the ventilator to be accommodated while reducing the amount of aerodynamic drag presented by the projection of the clearance space above the roof of the vehicle.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a sloped profile hingeless ventilator for ventilating an enclosure through a wall or roof, includes a frame having an outer surface and an inner surface disposed opposite the outer surface. The frame defines an opening therethrough. The frame defines a border around the opening, and the border includes a front, a first side contiguous with the front, a back contiguous with the first side, and a second side contiguous with the back and with the front.

The ventilator includes a cover having an outside surface and an inside surface disposed opposite the outside surface. The inside surface of the cover is disposed generally to face toward the outer surface of the frame. The cover is selectively swingable relative to the frame between a closed position and open positions that are intermediate the closed position and at least one of the front and the back of the border of the frame. Desirably, the open positions are intermediate both the front and the back of the frame.

The ventilator includes an actuating member extending from the inside surface of the cover and through the opening. The actuating member defines a positioning slot therethrough. The positioning slot defines an elongated shape with an apex portion disposed relatively near the inside surface of the cover and a distal portion disposed at an end of the slot relatively farther from the inside surface of the cover than the apex portion.

The ventilator includes a tensioning rod having opposite ends. The rod extends across the opening and through the positioning slot of the actuating member and extends between opposite sides of the frame. Each of the ends of the rod is non-movably fixed on opposite sides of the frame, and the rod is maintained under tension to bias the cover toward the frame.

A handle is secured to the actuating member. The positioning slot defines a shape that includes at least one side branch that extends generally away from the apex portion so that when an operator grasps the handle and arcs the actuating member about the tensioning rod, the cover swings in at least one direction to at least one open position.

The ventilator includes a sloped recessed chamber connected to the frame and defining a depth configured to contain the actuating member and the handle. The recessed chamber defines a base connected to the frame. The recessed chamber defines a mounting flange that Is disposed generally parallel to the base and opposed to the base. The recessed chamber defines a sloping front panel extending at an angle between the base and the mounting flange. The recessed chamber defines a sloping rear panel extending at an angle between the base and the mounting flange. The recessed chamber defines a first side panel extending between the base and the mounting flange and between the front panel and the rear panel. The recessed chamber defines a second side panel extending between the base and the mounting flange and between the front panel and the rear panel.

The accompanying drawings, which are incorporated in and constitute a part of this specification, illustrate one presently preferred embodiment of the invention and, together with the description, serve to explain the principles of the invention.

BRIEF DESCRIPTION OF THE DRAWINGS

FIG. 3A is a cross-sectional view of the embodiment of FIG. 2 taken along the direction of the arrows designated 3A—3A in FIG. 2;

DETAILED DESCRIPTION OF THE PREFERRED EMBODIMENTS

Figure 1:
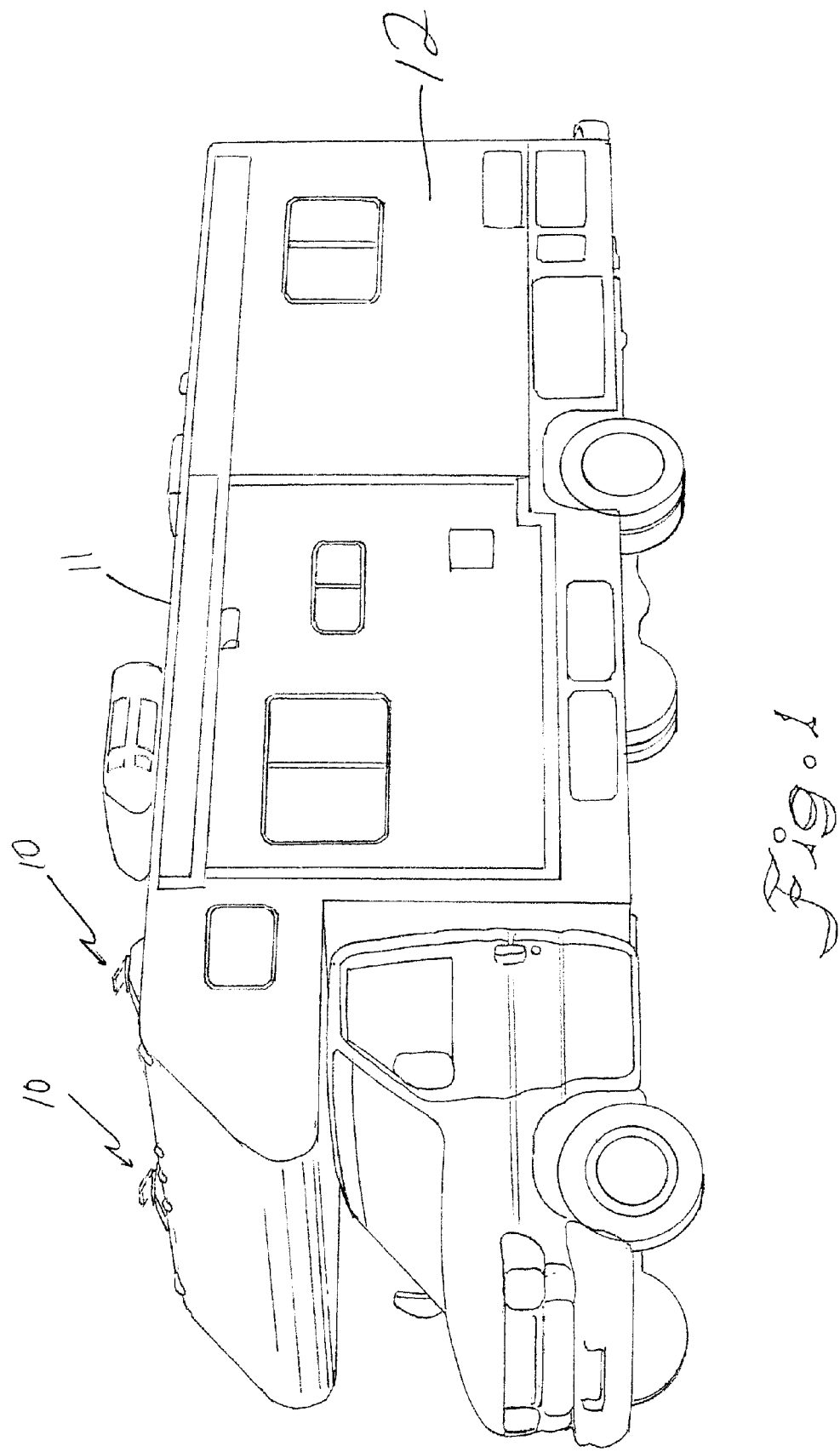
FIG. 1 is an elevated perspective view of an embodiment of the present invention installed in the environment in which the device is intended to be employed.

Reference now will be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or-spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description.

A presently preferred embodiment of the improved hingeless ventilator of the present invention is shown in FIGS. 1–4 and designated generally by the numeral 10. A pair of such ventilators 10 is shown installed in the roof 11 of a recreational vehicle 12 in FIG. 1 for example. The ventilator 10 can be sized according to the environment in which it is to be installed.

Figure 2:
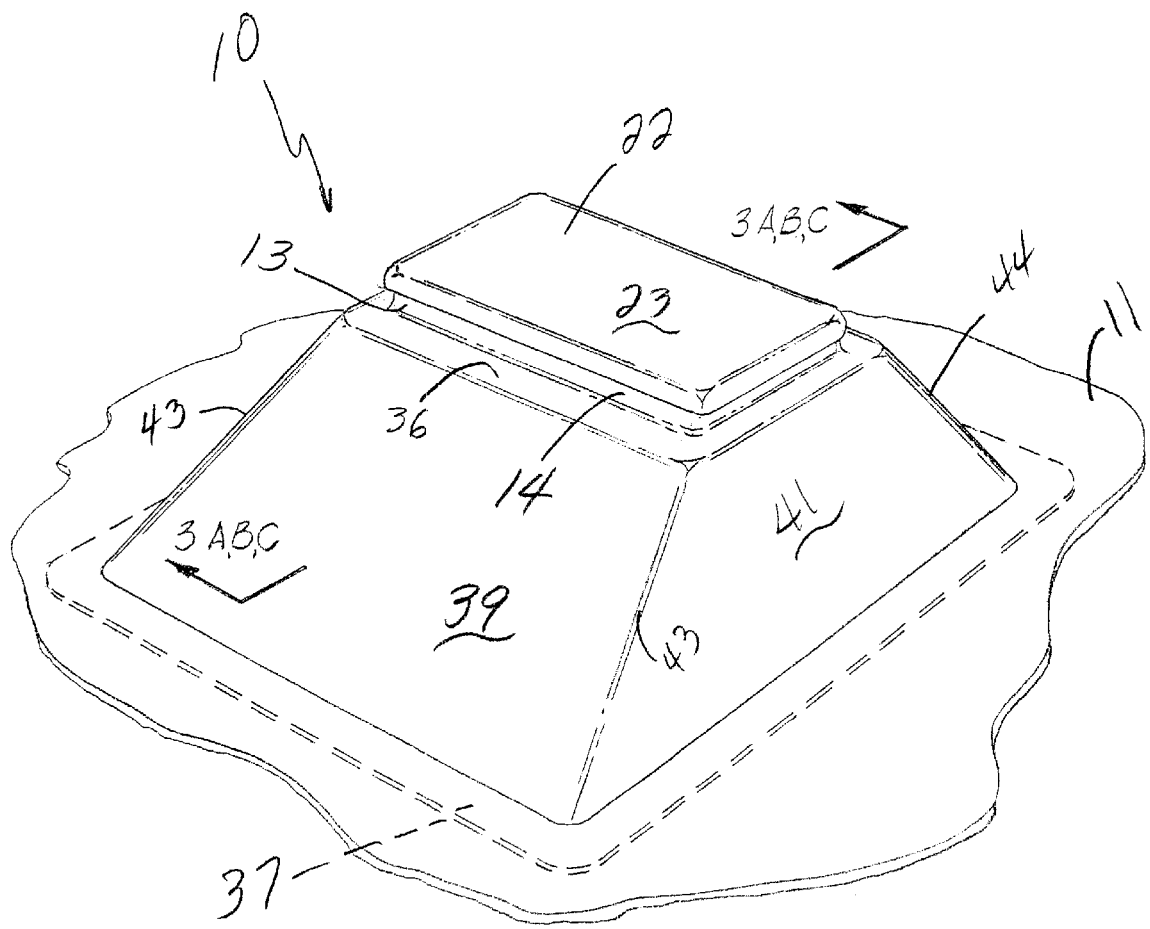
FIG. 2 is an elevated perspective view of an embodiment of the present invention taken of the exterior of the ventilator.
Figure 3B:
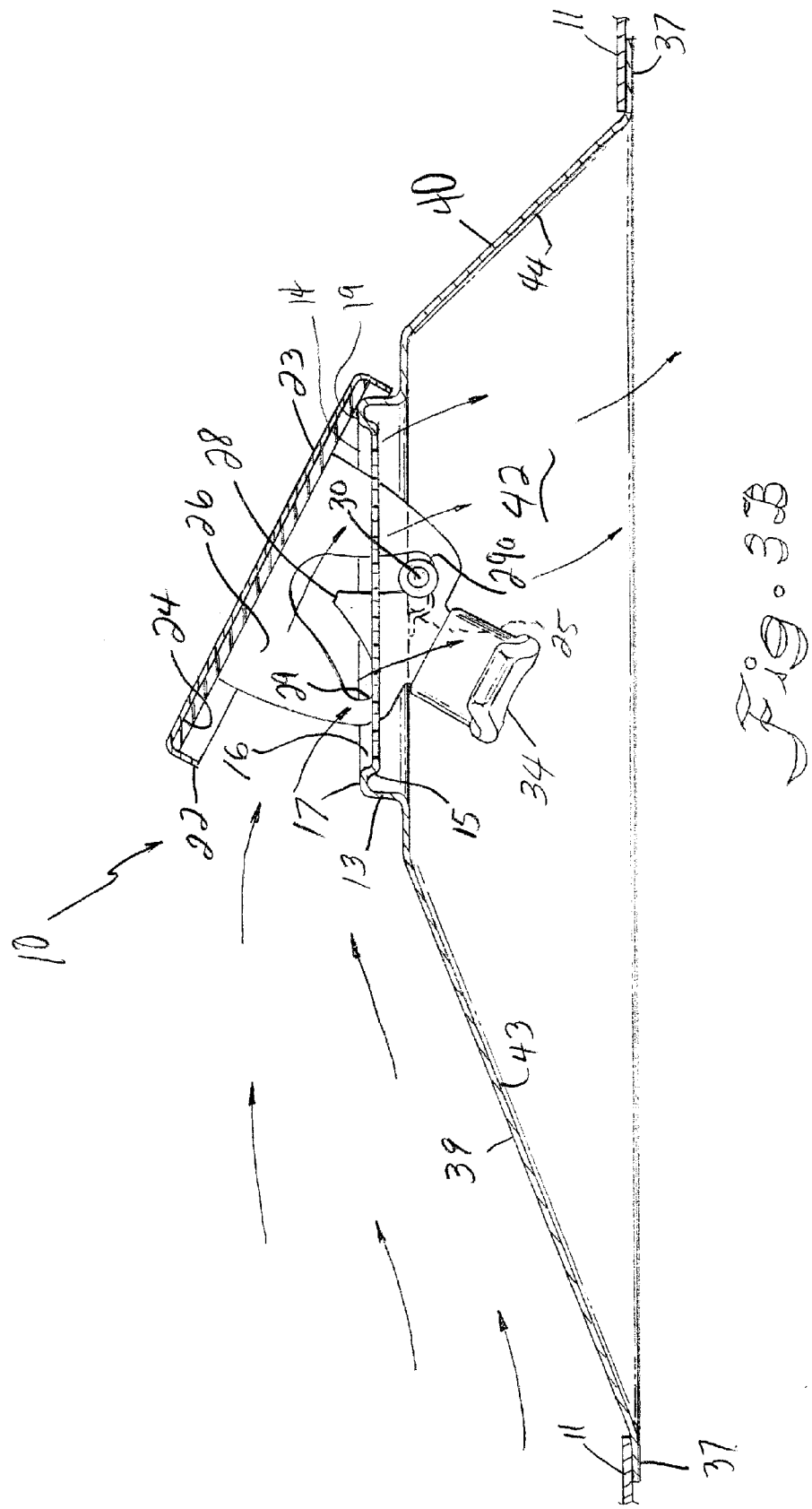
FIG. 3B is a cross-sectional view of the embodiment of FIG. 2 taken along the direction of the arrows designated 3B—3B in FIG. 2.
Figure 3C:
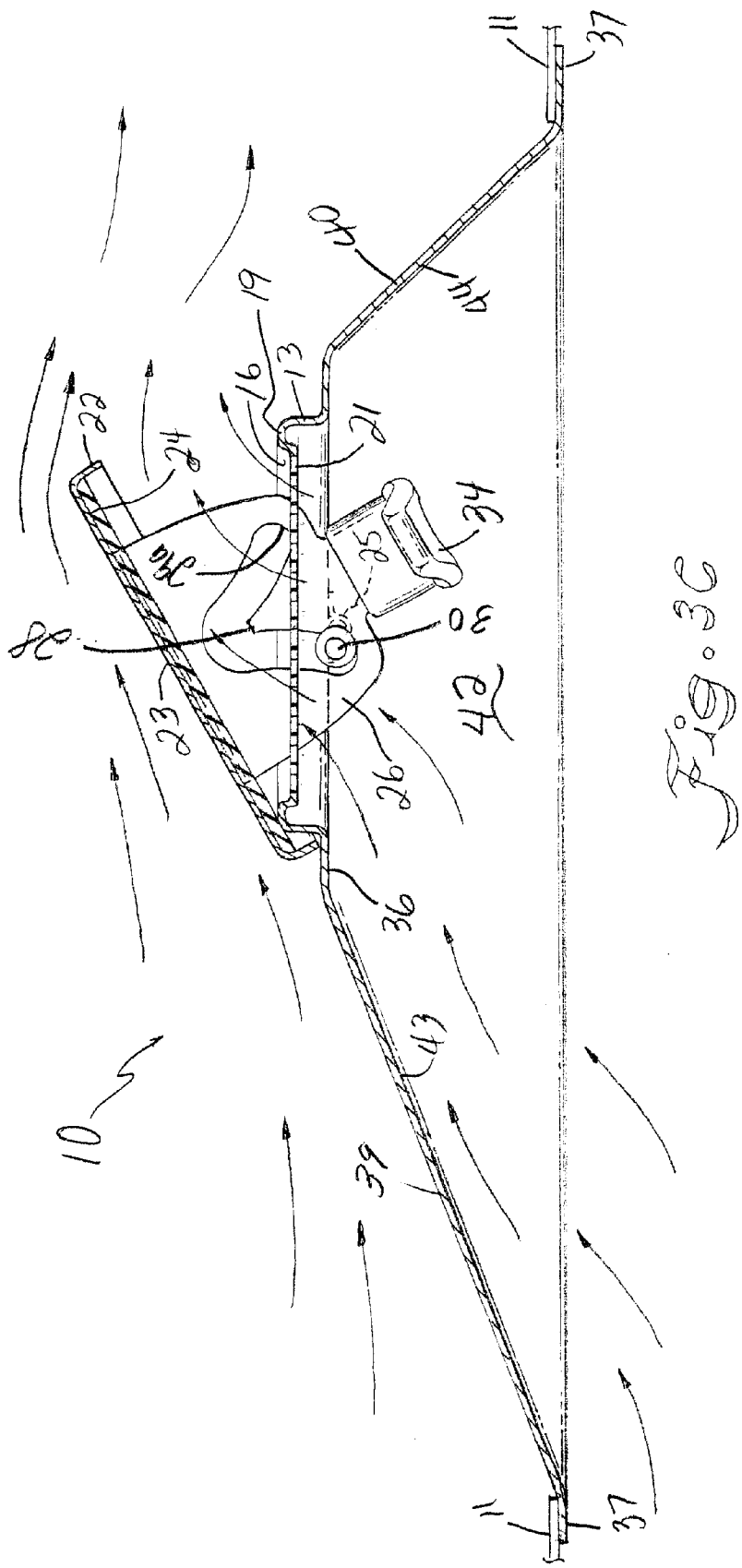
FIG. 3C is a cross-sectional view of the embodiment of FIG. 2 taken along the direction of the arrows designated 3C—3C in FIG. 2.
Figure 4:
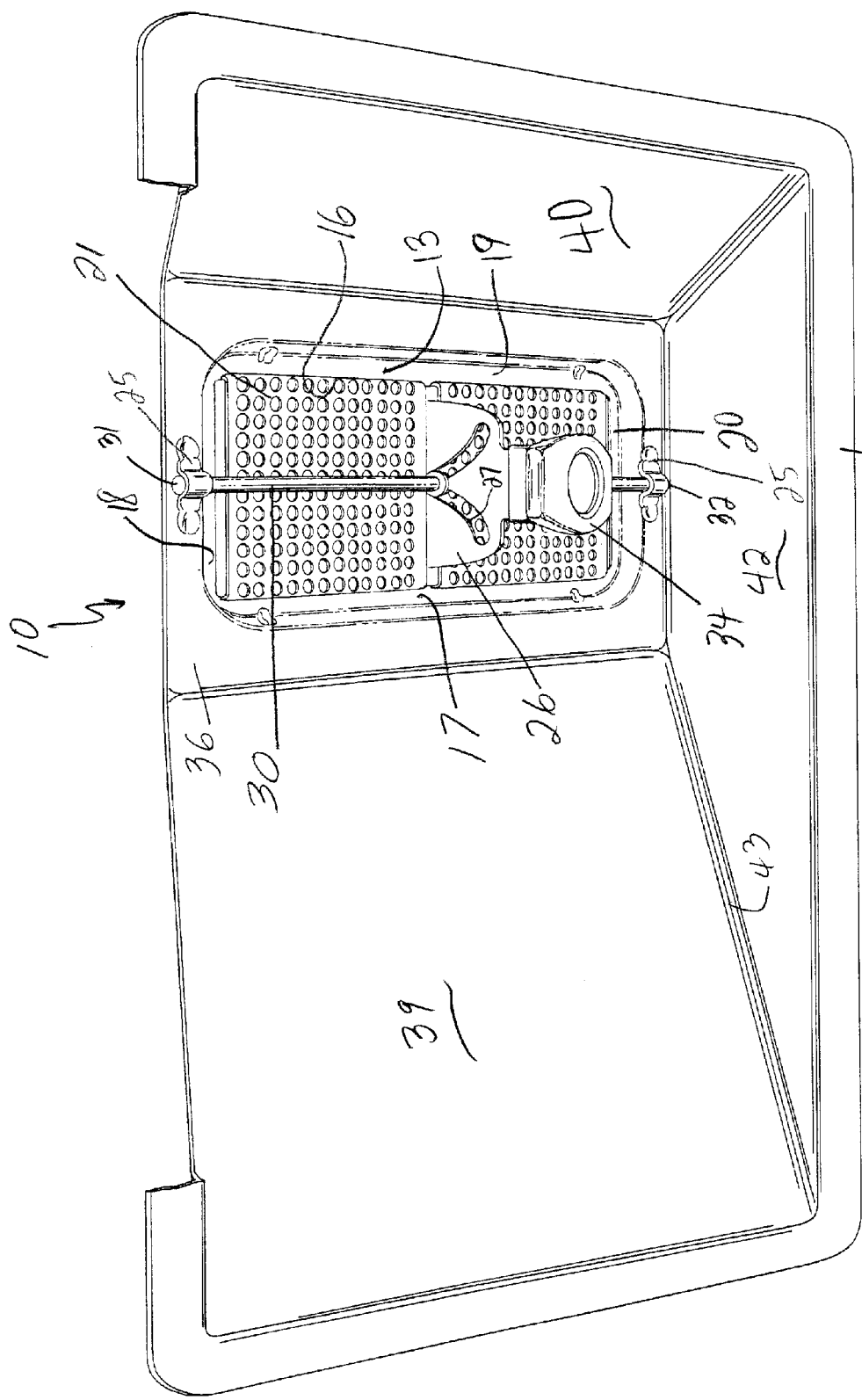
FIG. 4 is an elevated perspective view of an embodiment of the present invention taken of the interior of the ventilator.

As embodied herein and shown in FIG. 2 for example, a sloped profile hingeless ventilator 10 for ventilating an enclosure through a wall such as the roof 11 of a vehicle 12, includes a frame 13 having an outer surface 14. As shown in FIGS. 3A and 3B for example, frame 13 has an inner surface 15 disposed opposite the outer surface 14. As shown in FIGS. 3B and 3C for example, the frame 13 defines an opening 16 therethrough. As shown in the view of FIG. 4 taken from inside the ventilator 10 for example, the frame 13 defines a border around the opening 16, and the border includes a front 17, a first side 18 contiguous with the front 17, a back 19 contiguous with the first side 18 and disposed opposite front 17, and a second side 20 contiguous with the back 19 and with the front 17 and disposed opposite the first side 18. As shown in FIG. 4 for example, a perforated plate 21 or screen can be placed across the opening 16 defined through the frame 13 of the ventilator 10.

As shown in FIGS. 3A, 3B and 3C for example, the ventilator 10 includes a cover 22 that selectively is capable of being positioned to close the opening 16. The cover 22 defines an outside surface 23 and an Inside surface 24 disposed opposite the outside surface 23. The inside surface 24 of the cover 22 is disposed generally to face toward the outer surface 14 of the frame 13. The cover 22 is selectively swingable relative to the frame 13 between a closed position (FIG. 3A) and open positions that are intermediate the closed position and at least one of the front 17 and the back 19 of the border of the frame 13. Desirably, there are open positions that are intermediate the closed position and the front 17, and there are open positions that are intermediate the closed position and the back 19 of the frame 13.

The ventilator includes an actuating device for effecting movement of the cover relative to the frame. Accordingly, the actuating device permits the operator to vary the position of the cover relative to the opening in the frame. As shown in FIGS. 3A, 3B, 3C and 4 for example, the actuating device of the ventilator 10 can include at least one actuating member 26 extending from the inside surface 24 of the cover 22 and through the opening 16. As shown in FIG. 3A for example, the actuating member 26 defines a positioning slot 27 therethrough. As shown in FIGS. 3B and 3C for example, the positioning slot 27 defines an elongated shape with an apex portion 28 disposed relatively near the inside surface 24 of the cover. The shape of the positioning slot 27 also desirably includes at least one distal portion 29 or 29a disposed at an end of the slot 27 relatively farther from the inside surface 24 of the cover 22 than the apex portion 28.

As shown in FIG. 4 for example, the actuating device of ventilator 10 includes a tensioning rod 30 having opposite ends 31, 32. The rod 30 extends across the opening 16 and through the positioning slot 27 of the actuating member 26 and extends between opposite sides 18, 20 of the frame 13. As shown in FIG. 4, each of the ends 31, 32 of the rod 30 is non-movably fixed on opposite sides of the frame by a bracket 25. The fixing of the bracket 25 to the frame can be accomplished in any of a number of ways, including welding, gluing, molding and the like. As shown in FIGS. 3B and 3C for example, bracket 25 is shown in phantom by the dashed line, and is visible due to the bending of rod 30 under tension. The rod 30 is maintained under tension to bias the cover 22 toward the frame 13.

A handle 34 is secured to the free end of the actuating member 26. Moreover, as shown in FIG. 3A for example, the positioning slot 27 comprises a shape that includes at least one side branch 35 that extends generally away from the apex portion 28 (when the cover closes the opening) so that when an operator grasps the handle 34 and arcs the actuating member 26 about the tensioning rod 30, the cover 22 swings in at least one direction (toward front 17 and/or back 19 of the border of the frame 13) to at least one open position. The details of the configuration of the actuating device embodiment of the ventilator 10 are the same as shown in commonly owned and U.S. Pat. No. 6,280,315, the contents of which are incorporated in their entireties herein by this reference.

As shown in FIGS. 2–4 for example, the ventilator 10 includes a sloped recessed chamber. One end of the recessed chamber is a base that is connected to the frame. As shown in FIGS. 2 and 4 for example, the recessed chamber defines a base 36 connected to the frame 13. The base 36 is desirably generally horizontally disposed, but can be otherwise configured. The recessed chamber further defines a mounting flange 37 that is disposed opposite to the base 36. The mounting flange 37 can be disposed generally parallel to the base 36, but can be otherwise configured. The recessed chamber is configured generally to open outwardly and define a depth that extends between the base 36 and the opening at the mounting flange 37. The depth of the recessed chamber can be desirably configured to contain the actuating member 26 and the handle 34 of the ventilator.

As shown in FIG. 2 for example, the ventilator 10 can be attached to the roof 11 of the vehicle via the mounting flange 37. Normally, the mounting flange 37 is installed on the outside of the roof 11. However, as shown in FIG. 2 wherein the border of the mounting flange 37 is shown in dashed line, the mounting flange 37 can be disposed beneath the roof 11 of the vehicle. While the roof 11 of the vehicle shown in FIGS. 3A, 3B and 3C is schematically indicated by a single layer of metal, this aspect of the attachment of the mounting flange 37 to the vehicle can be effected in any of a number of ways by simple modification of the flange 37 according to the requirements of the vehicle manufacturer.

As shown in FIGS. 2 and 4 for example, the recessed chamber defines a sloping front panel 39 extending between the base 36 and the mounting flange 37. As shown in FIG. 4 for example, the recessed chamber defines a sloping rear panel 40 extending between the base 36 and the mounting flange 37.

As shown in FIG. 2 for example, the recessed chamber defines a first side panel 41 extending between the base 36 and the mounting flange 37 and between the front panel 39 and the rear panel 40. As shown in FIGS. 3A, 3B, 3C and 4 for example, the recessed chamber defines a second side panel 42 that is opposite the first side panel and that extends between the base 36 and the mounting flange 37 and between the front panel 39 and the rear panel 40. As shown in FIG. 2 for example, the first side panel 41 of the recessed chamber is oriented in a generally vertical plane that is perpendicular to the mounting flange 37 as well as to the base 36. Though not readily apparent from the views shown in the Figs., second side panel 42 is also oriented in a generally vertical plane that is perpendicular to the mounting flange 37 as well as perpendicular to the base 36 of the recessed chamber.

As shown in FIGS. 3A, 3B and 3C for example, the leading edge 43 of each side panel 41, 42 where the side panel joins to the front panel 39, is angled at a first acute angle from the horizontal plane in which the mounting flange 37 resides when installed in place in a vehicle. Similarly, the trailing edge 44 of each side panel 41, 42 where the side panel joins to the rear panel 40, is angled at a second acute angle from the horizontal plane in which the mounting flange 37 resides when installed in place in a vehicle. Moreover, the first acute angle at the leading edge 43 desirably is smaller than the second acute angle at the trailing edge 44 of each side panel. Similarly, the leading edge 43 of each side panel 41, 42 is disposed at a first obtuse angle from the horizontal plane of the base 36. The trailing edge 44 of each side panel 41, 42 is disposed at a second obtuse angle from the horizontal plane of the base 36. The first obtuse angle is greater than the second obtuse angle.

The recessed chamber is configured so as to permit the installation of the ventilator while without intruding into the head clearance inside the vehicle. As shown in the cross-sectional view of FIG. 3A, the cover 22 is disposed in the completely closed position, and the arrows indicate the direction of air flow as the vehicle is in forward motion. Because of the sloping front panel 39 of the recessed chamber, the ventilator 10 tends to reduce the drag attendant the air flow as it passes over the roof of the vehicle. Moreover, the aerodynamic shape of the recessed chamber permits the clearance necessary for the operating mechanism of the ventilator 10 to be accommodated while reducing the amount of aerodynamic drag presented by the projection of the recessed chamber (and the clearance space afforded by the recessed chamber) above the roof 11 of the vehicle 12.

As shown in the cross-sectional view of FIG. 3B for example, the cover 22 is oriented so as to maximize the opening of the ventilator 10 toward the front panel 39 of the recessed chamber and the front of the vehicle during normal travel of the vehicle. The inside surface 24 of the cover 22 acts to deflect the air flow down into the interior of the vehicle as shown by the direction of the arrows in FIG. 3B.

In the cross-sectional view shown in FIG. 3C for example, the arrows point in the direction of the air flow relative to the ventilator 10 when the vehicle is in forward motion, and the cover 22 of the ventilator 10 is oriented in the position that maximizes the access to the opening 16 facing the rear of the vehicle and the rear panel 40 of the ventilator 10. This is the cover's position that is most desirable when expulsion of air from within the vehicle while the vehicle is in motion is the goal.

Desirably, as shown in FIG. 3C for example, the disposition of the cover 22 can be oriented so as to present essentially the same angle from the horizontal relative to the base 36 as the leading edge 43 of the side panels 41, 42, and therefore the front panel 39 and the cover 22 can form a surface with an essentially uniform slope relative to the horizontal at the plane of the mounting flange 37. Moreover, as shown in FIG. 3C for example, this orientation of cover 22 is also desirably achieved when the tension rod 30 is disposed in one extreme distal end 29, 29a of the positioning slot 27 that is farthest away from the cover 22.

While a preferred embodiment of the invention has been described using specific terms, such description is for illustrative purposes only, and it is to be understood that changes and variations may be made without departing from the spirit or scope of the following claims. For example, a ventilator with a different embodiment of the actuating device can be combined with the recessed chamber as described above. Such different actuating device embodiment can be of the type disclosed in commonly owned U.S. Pat. No. 4,452,129, the contents of which are incorporated herein in their entireties by this reference. There, the actuating device can include at least a pair of arm means that is fixed to the cover and instanding therefrom through the opening in the frame. The actuating device can further include guide means that are fixed to and instanding from the frame. Elastomeric roller means are mounted on the arm means and riding on and compressed against the guide means as the cover is swingable relative to the frame.

What is claimed is:

1. A hingeless ventilator for ventilating an enclosure through a wall thereof, comprising:
   a frame having an outer surface and an inner surface disposed opposite said outer surface, said frame defining an opening therethrough, said frame defining a border around said opening and said border including a front, a first side contiguous with said front, a back contiguous with said first side, and a second side contiguous with said back and said front;
   a cover having an outside surface and an inside surface disposed opposite said outside surface, said inside surface of said cover being generally disposed to face toward said outer surface of said frame, and said cover being selectively swingable relative to said frame between a closed position and open positions intermediate said closed position and at least one said of said front and said back;
   an actuating device configured to effect varying of the position of said cover relative to said opening in said frame, said actuating device including at least one actuating member extending from said inside surface of said cover and through said opening;
   a handle secured to said actuating member; and
   a recessed chamber connected to said frame and defining a depth configured to contain said actuating member and said handle, said recessed chamber defining a base connected to said frame, said recessed chamber defining a mounting flange disposed generally parallel to said base and opposed to said base, said recessed chamber defining a front panel extending between said base and said mounting flange, said recessed chamber defining a rear panel extending between said base and said mounting flange, said recessed chamber defining a first side panel extending between said base and said mounting flange and between said front panel and said rear panel, said recessed chamber defining a second side panel extending between said base and said mounting flange and between said front panel and said rear panel.

2. An apparatus as in claim 1, wherein said actuating member defines a positioning slot therethrough, said positioning slot defining an elongated shape with an apex portion disposed near said inside surface of said cover and a distal portion disposed at an end of said slot farthest from said inside surface of said cover.

3. An apparatus as in claim 2, wherein said actuating device further includes a tensioning rod having opposite ends, said rod being non-movably fixed on said frame and extending between opposite sides of said opening and under tension through said positioning slot of said actuating member to bias said cover toward said frame.

4. An apparatus as in claim 3, wherein said positioning slot comprises a shape including at least one side branch extending generally away from said apex portion so that by an operator grasping said handle and arcing said actuating member about said tensioning rod, said cover can be swung in at least one direction to at least one open position.

5. An apparatus as in claim 1, wherein said front panel of said recessed chamber extends at a first acute angle from said mounting flange and at a first obtuse angle from said base.

6. A device as in claim 5, wherein said rear panel of said recessed chamber extends at a second acute angle from said mounting flange and at a second obtuse angle from said base.

7. A ventilator as in claim 6, wherein said first acute angle is smaller than said second acute angle.

8. A device as in claim 1, wherein said rear panel of said recessed chamber extends at a second acute angle from said mounting flange and at a second obtuse angle from said base.

9. A hingeless ventilator for ventilating an enclosure through a wall thereof, comprising:

a frame having an outer surface and an inner surface disposed opposite said outer surface, said frame defining an opening therethrough, said frame defining a border around said opening and said border including a front, a first side contiguous with said front, a back contiguous with said first side, and a second side contiguous with said back and said front;

a cover having an outside surface and an inside surface disposed opposite said outside surface, said inside surface of said cover being generally disposed to face toward said outer surface of said frame, and said cover being selectively swingable relative to said frame between a closed position and open positions intermediate said closed position and at least one said of said front and said back;

an actuating member extending from said inside surface of said cover and through said opening, said actuating member defining a positioning slot therethrough;

a tensioning rod having opposite ends, said rod being non-movably fixed on said frame and extending between opposite sides of said opening and under tension through said positioning slot of said actuating member to bias said cover toward said frame;

a handle secured to said actuating member; and a recessed chamber connected to said frame and defining a depth configured to contain said actuating member and said handle, said recessed chamber defining a base connected to said frame, said recessed chamber defining a mounting flange disposed generally parallel to said base and opposed to said base, said recessed chamber defining a front panel extending between said base and said mounting flange, said recessed chamber defining a rear panel extending between said base and said mounting flange, said recessed chamber defining a first side panel extending between said base and said mounting flange and between said front panel and said rear panel, said recessed chamber defining a second side panel extending between said base and said mounting flange and between said front panel and said rear panel.

10. An apparatus as in claim 1, wherein said actuating member defines at least one arm means fixed to said cover and instanding therefrom through said opening in said frame.

11. An apparatus as in claim 10, wherein said actuating device includes guide means fixed to and instanding from said frame.

12. An apparatus as in claim 11, wherein said actuating device includes elastomeric roller means mounted on said arm means and riding on and compressed against said guide means as said cover is swingable relative to said frame.

* * * * *